(12) United States Patent
Mangum

(10) Patent No.: US 8,267,513 B2
(45) Date of Patent: Sep. 18, 2012

(54) ATTACHMENT MECHANISM FOR EYE GLASS SHIELD

(76) Inventor: Chris Mangum, Huntington Beach, CA (US)

( * ) Notice: Subject to any disclaimer, the term of this patent is extended or adjusted under 35 U.S.C. 154(b) by 100 days.

(21) Appl. No.: 12/826,456

(22) Filed: Jun. 29, 2010

(65) Prior Publication Data

US 2011/0001920 A1    Jan. 6, 2011

Related U.S. Application Data

(60) Provisional application No. 61/222,892, filed on Jul. 2, 2009.

(51) Int. Cl.
*G02C 11/08* (2006.01)
(52) U.S. Cl. .................. 351/62; 351/44; 2/437

(58) Field of Classification Search ............ 351/41, 351/44, 62, 158; 2/435–437
See application file for complete search history.

(56) References Cited

U.S. PATENT DOCUMENTS

| 6,062,688 | A | 5/2000 | Vinas |
| 6,817,709 | B2 * | 11/2004 | Min ............... 351/62 |
| D591,329 | S | 4/2009 | Wang |
| D591,786 | S | 5/2009 | Wang |

\* cited by examiner

*Primary Examiner* — Huy K Mai

(57) ABSTRACT

Eyeglasses with an eye shield for protecting a wearer's eyes from airborne liquids, debris or contaminants. The eye shield is removably attached to the inner surface of the eyeglass frame at the left and right ends of the frame. The eyeglass frame has a pair of risers that slide into a pair of channels on the eye shield to securely and reliably attach the eye shield to the eyeglasses.

6 Claims, 3 Drawing Sheets

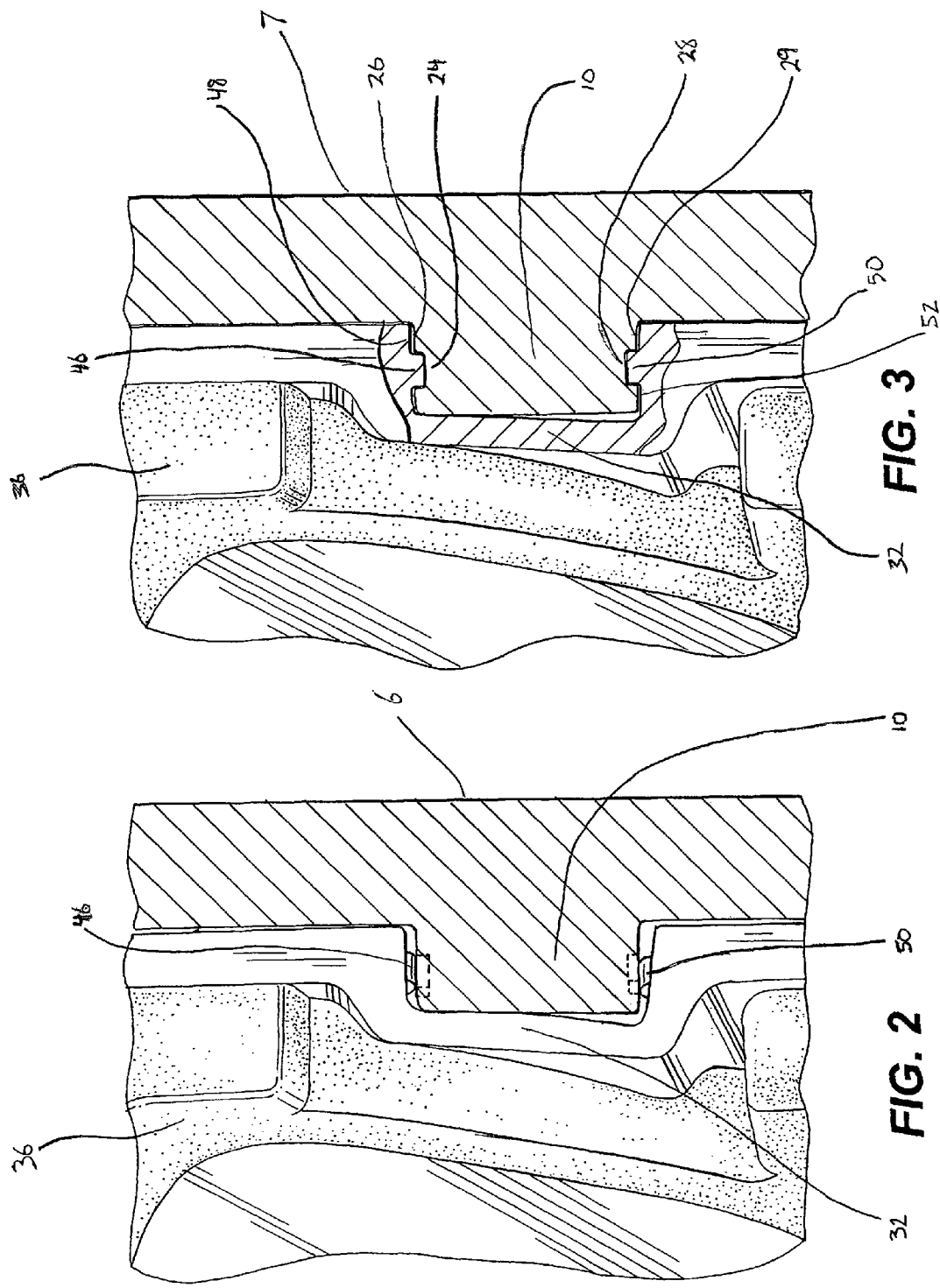

ATTACHMENT MECHANISM FOR EYE GLASS SHIELD

CROSS-REFERENCE TO RELATED APPLICATION

This application claims the benefit of provisional patent application No. 61/222,892 filed Jul. 2, 2009, the disclosure of which is incorporated herein in its entirety.

BACKGROUND OF THE INVENTION

1. Field of the Invention

The present invention relates generally to eye shields for attachment to eyeglasses so that the combination functions like goggles to protect the eyes from airborne pollutants.

2. Description of Related Art

U.S. Pat. No. 6,062,688 discloses a detachable eye shield for glasses that uses a variety of retaining mechanisms to attach a forward side of a shield to a rearward side of an eyeglass frame. Four types of retainer mechanisms are disclosed: pin-hole, magnetic, hoop and loop, and adhesive layer. The eye shield utilized is an air-permeable foam material.

The eye shield retaining mechanisms described in U.S. Pat. No. 6,062,688 have several problems. They are difficult to integrate into existing eyeglass designs because they require extensive and obtrusive modifications to the eyeglass frame. The pin-hole, hoop and loop, and adhesive layer attachment mechanisms render the eyeglasses very uncomfortable, if not impossible to wear when the eyeglass shield is removed. Attachment mechanisms on the inner surface of the eyeglass frame around the eyes creates this problem. Furthermore, the pin-hole attachment mechanism is unreliable because the pins tend to break with use. The hoop and loop and adhesive layer attachment mechanisms wear out over time.

SUMMARY OF THE INVENTION

The present invention overcomes the disadvantages of the prior art attachment mechanisms by using a simple and elegant attachment that allows the eye shield to be attached and removed many times and does not interfere with wearing of the eyeglasses when removed. The attachment mechanism has a pair of risers on one end of the inner surface of the eyeglass frame. A pair of channels, one on each end of the outer surface of the eye shields, are sized to fit snuggly over the riser on the frame. The risers have a pair of indentations, one on the upper surface and one on the lower surface of the riser. The channels have a pair of nubs, one on the upper surface and one on the lower surface of the channel. The eye shield is attached to the frame by sliding the channels over the risers until the nubs are located in the indentations. The eye shield is then securely and reliably attached to the eyeglass frame to protect the wearer's eyes from liquids, debris or other airborne contaminants.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 2 is a perspective, partially in cross-section, of the left channel and left riser attachment mechanism;

FIG. 3 is a perspective view, partially in cross-section, of the left channel and left riser attachment mechanism.

DETAILED DESCRIPTION OF THE PREFERRED EMBODIMENTS

Figure 1:
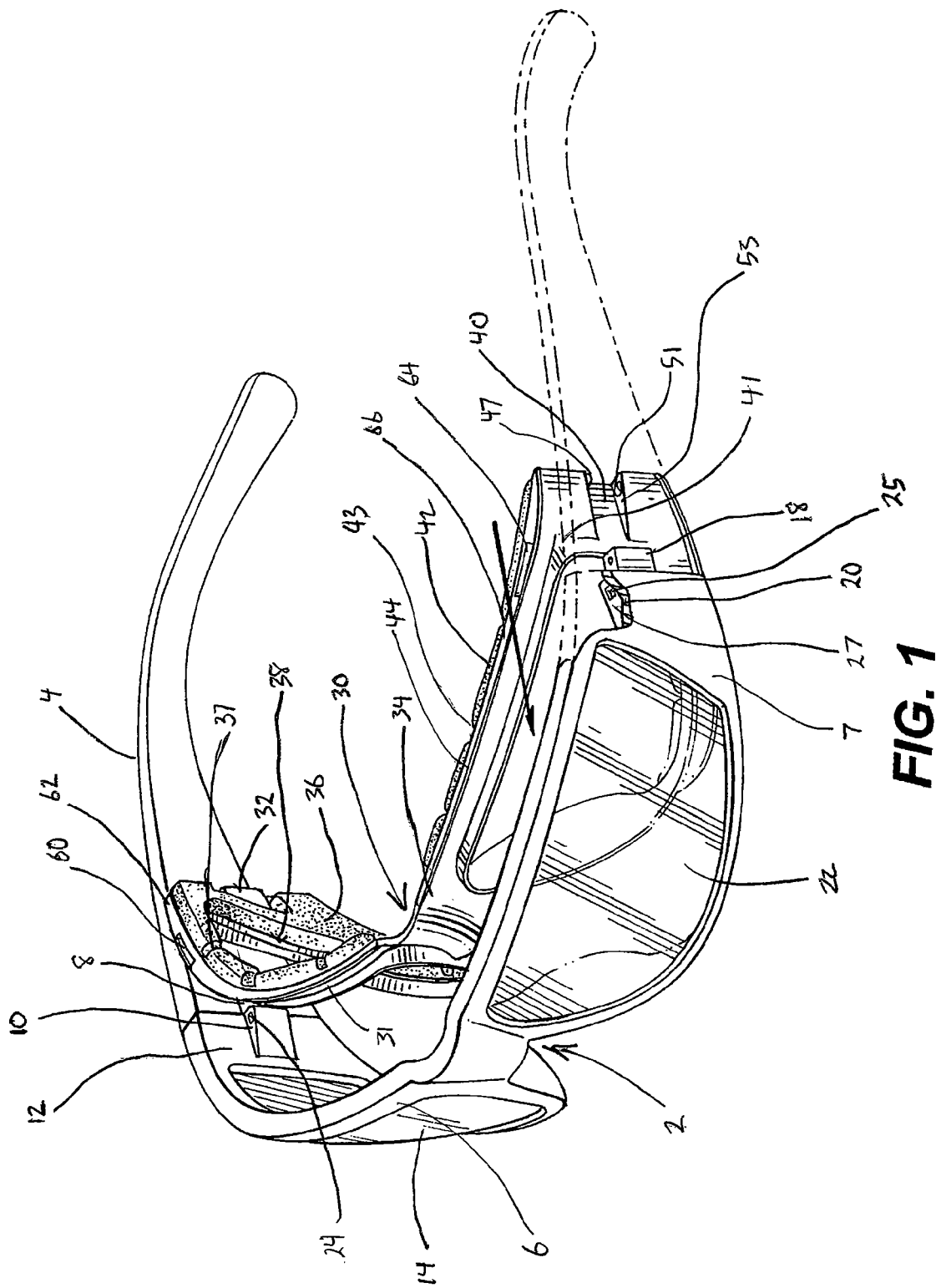
FIG. 1 is a perspective view of a preferred embodiment of the eyeglasses and eye shield.

FIG. 1 illustrates a preferred embodiment of the eyeglasses and eye shield. An eyeglass frame 2 has a left temple connector 4 joined to the left side of the frame 2 at a left hinge 8. A left riser 10 is located on the left inner surface 12 of the frame 2 between the left hinge 8 and a left lens 14. A right temple connector 16 (FIG. 4) is joined to the right side of the frame 2 at a right hinge 18. A right riser 20 is located on the right inner surface (not shown) of the frame 2 between a right lens 22 and the right hinge 18.

An eye shield 30 having a substantially rigid base 34 which conforms in shape to the contours of the frame 2 carries foam sealing elements 36, 42. A left channel 32 is located at the left end of the left outer surface 31 of the base 34. A left upper slot 60 is located along a left upper edge 62 of the base 34. A right upper slot 64 is located along the right upper edge 66 of the base 34. A right channel 40 is located at the right end of the right outer surface 41 of the base 34. The base is preferably made out of a rigid lightweight plastic material.

The foam shielding elements 36, 42 attached to the base 34 are preferably made out of closed-cell foam. A left foam shielding element 36 that conforms to the contours of the left side of the base 34 is permanently attached to the inner surface 38 of the base 34. The closed-cell foam shielding element 36 has a plurality of slits 37 around the periphery of the foam shielding element. A right foam shielding element 42 that conforms to the contours of the right side of the base 34 is permanently attached to the inner surface 44 of the base 34. The closed-cell foam shielding element 42 has a plurality of slits 43 around the periphery of the foam shielding element. These slits, along with the slots 60 and 64 in the base 34 provide for air circulation to the eye without allowing airborne particles in.

FIG. 3 illustrates a detailed view of the left riser 10 and the left channel 32. A left top nub 46 is located on the upper surface 48 of the left channel 32. A left bottom nub 50 is located on the lower surface 52 of the left channel 32. A left top indentation 24 is located on an upper surface 26 of the left riser 10. The top nub 46 fits into the top indentation 24. A left bottom indentation 28 is located on a lower surface 29 of the left riser 10. The bottom nub 50 fits into the bottom indentation 28. This structure locks the eye shield 30 to the eyeglass frame 2.

The right riser 20 and right channel 40 are similar in structure and function to the left riser 10 and the left channel 32. Referring to FIG. 1, the right channel 40, has a right top nub 47 located on an upper surface (not shown) and a right bottom nub 51 located on a lower surface 53. The right riser 20 has a right top indentation 25 on an upper surface 27 and a right bottom indentation (not shown) on a lower surface (not shown).

Referring to FIG. 1, to attach the eye shield 30 to the frame 2, the left outer surface 31 of the substantially rigid member 34 is placed against the left inner surface 12 of the frame 2 so that the left channel 32 is aligned with the left riser 10. While, the right outer surface 41 of the substantially rigid member 34 is placed against the right inner surface (not shown) of the frame 2 so that the right channel 40 is aligned with the right riser 20.

As shown in FIG. 2, once aligned, force is applied to the left shielding element 36 and the left outer surface 6 of the frame 2 to push the left riser 10 into the left channel 32 until the nub 46 and 50 fit into the indentations, as shown in FIG. 3.

In a similar manner, force is applied to the right shielding element 42 and a right outer surface 7 of the frame 2 (FIG. 1), until the right riser 20 fits into the right channel 40, causing the right top nub 47 to fit into the right top indentation 25 and the right bottom nub 51 to fit into the right bottom indentation.

Figure 4:
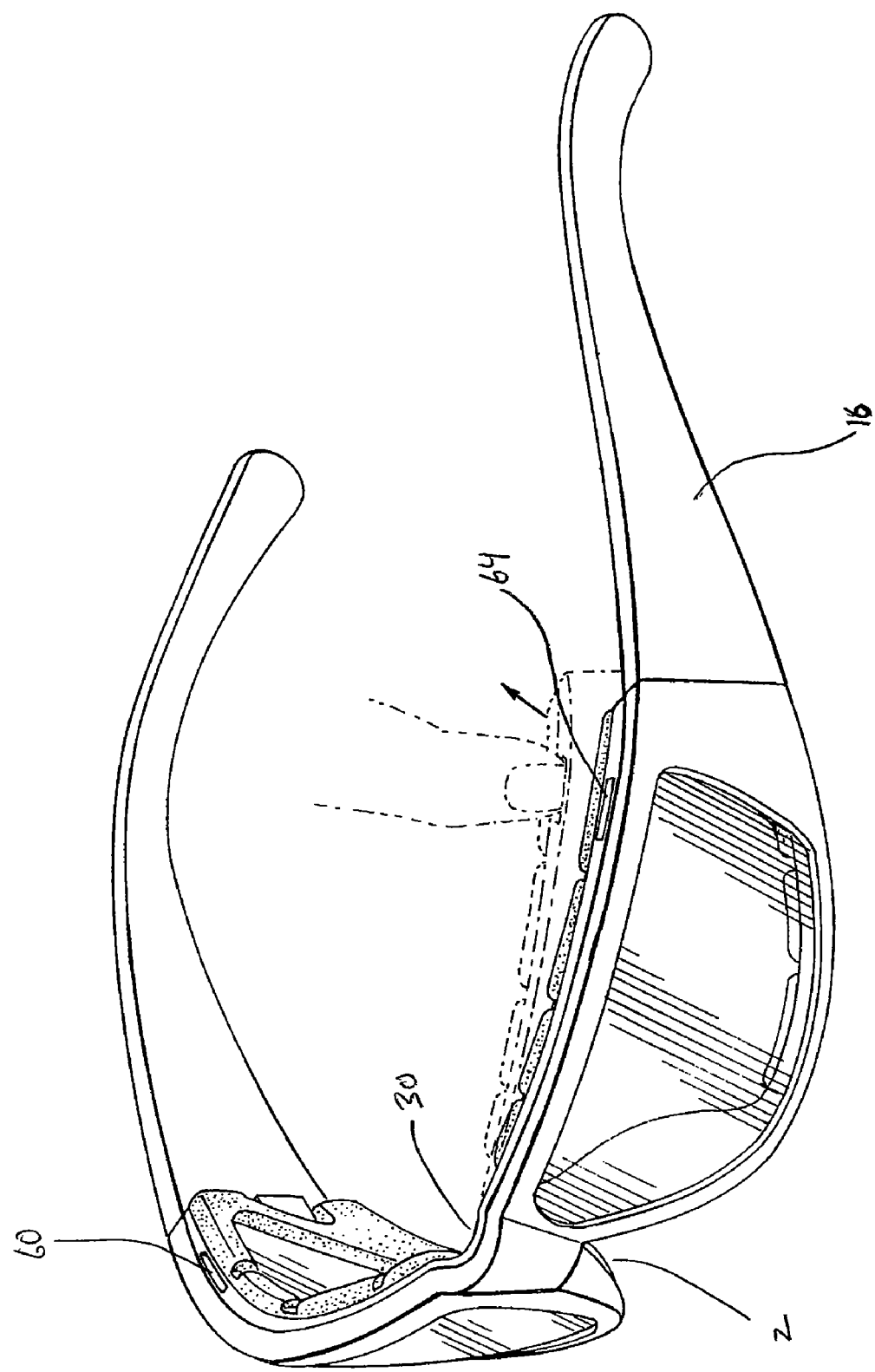
FIG. 4 is a perspective view of a preferred embodiment of the eyeglasses and eye shield, showing how the eye shield can be detached from the eyeglass frame.

FIG. 4 illustrates how easy it is to detach the eye shield 30 from the frame 2. A user simply grasps the frame 2, placing a fingernail in the right upper slot 64 and pulls rearwardly. The user then places his finger in the left upper slot 60 and pulls rearwardly. Once the eye shield 30 is detached from frame 2, the frame appears to be a regular eyeglass frame without any readily apparent indication of its dual function as eye protecting goggles.

What is claimed is:

1. Eyeglasses having an outer frame and a detachable inner frame eye shield, comprising:
    an outer frame having a left and right lens, a left hinge on the inner surface of the outer frame a right hinge on the inner surface of the outer frame, a left riser on the inner surface of the outer frame between the left hinge and left lens with an indentation for receiving a nub, and a right riser on the inner surface of the outer frame between the right hinge and right lens with an indentation for receiving a nub; and
    an inner frame eye shield having a substantially rigid base which conforms to the contours of the outer frame including the left and right lenses, the inner frame having foam sealing elements on the inner surface of the inner frame around the outside of the left and right lenses, a left channel in the outer surface of the inner frame, at the left end of the inner frame, sized to receive the left riser on the inner surface of the outer frame, the left channel including a nub sized to fit into the indentation in the left riser of the outer frame, a right channel in the outer surface of the inner frame, at the right end of the inner frame sized to receive the right riser on the inner surface of the outer frame, the right channel including a nub sized to fill into the indentation in the right riser on the outer frame, thereby firmly holding the inner frame eye shield to the outer frame.

2. The eyeglasses of claim 1 wherein the foam sealing elements on the inner surface of the inner frame are closed cell foam.

3. The eyeglasses of claim 1 wherein the left riser and right riser on the inside of the outer frame have the indentation located on a top side, and the left channel and right channel in the outer surface of the inner frame have a nub located in a top of the channel.

4. The eyeglasses of claim 3 wherein the left riser and right riser on the inside of the outer frame further have an indentation located on a bottom side, and the left channel and right channel in the outer surface of the inner frame further have a nub located on a bottom of the channel.

5. The eyeglasses of claim 1 wherein the foam sealing element has slits at the top edge of the inside surface for permitting air circulation.

6. The eyeglasses of claim 1 wherein the inner frame has a slot in the outside surface at the top for permitting air circulation.

* * * * *